(12) United States Patent
Bizub

(10) Patent No.: US 9,874,488 B2
(45) Date of Patent: Jan. 23, 2018

(54) SYSTEM AND METHOD FOR DETECTING OPERATING EVENTS OF AN ENGINE

(71) Applicant: General Electric Company, Schenectady, NY (US)

(72) Inventor: Jeffrey Jacob Bizub, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 414 days.

(21) Appl. No.: 14/609,416

(22) Filed: Jan. 29, 2015

(65) Prior Publication Data

US 2016/0223422 A1   Aug. 4, 2016

(51) Int. Cl.
    *G01L 23/22*      (2006.01)
    *F02D 35/02*      (2006.01)
    *G01M 15/12*      (2006.01)
    *F02B 77/08*      (2006.01)

(52) U.S. Cl.
    CPC .......... *G01L 23/221* (2013.01); *F02B 77/085* (2013.01); *F02D 35/027* (2013.01); *G01M 15/12* (2013.01); *F02D 2200/025* (2013.01)

(58) Field of Classification Search
    CPC ..... G01L 23/22; G01L 23/221; G01L 23/225; F02B 77/085; F02D 35/027; F02D 2200/025; G01M 15/12
    See application file for complete search history.

(56) References Cited

U.S. PATENT DOCUMENTS

| | | | |
|---|---|---|---|
| 5,029,565 A | 7/1991 | Talbot | |
| 5,111,790 A | 5/1992 | Grandy | |
| 5,115,778 A | 5/1992 | Holroyd | |
| 5,119,783 A | 6/1992 | Komurasski | |
| 5,241,480 A | 8/1993 | Takaku et al. | |
| 5,257,533 A | 11/1993 | Imada | |
| 5,287,837 A * | 2/1994 | Hashimoto | F02P 5/152 123/406.29 |
| 5,337,240 A | 8/1994 | Nakagawa et al. | |
| 5,339,245 A | 8/1994 | Hirata et al. | |
| 5,361,213 A | 11/1994 | Fujieda et al. | |

(Continued)

FOREIGN PATENT DOCUMENTS

| | | |
|---|---|---|
| CN | 203480037 | 3/2014 |
| EP | 1447654 | 8/2004 |

(Continued)

OTHER PUBLICATIONS

Vulli et al., "Time-Frequency Analysis of Single-point Engine-Block Vibration Measurements for Multiple Excitation-Event Identification", Journal of Sound and Vibration, vol. No. 321, Issue No. 3-5, pp. 1129-1143, Apr. 10, 2009.

(Continued)

*Primary Examiner* — Hieu T Vo
(74) *Attorney, Agent, or Firm* — Fletcher Yoder, P.C.

(57) ABSTRACT

A method of monitoring an operating event of a combustion engine includes receiving a noise signal sensed by a knock sensor disposed in or proximate to the combustion engine, correlating the noise signal with a fingerprint having at least an ADSR envelope indicative of the operating event, and detecting if the operating event has occurred based on the correlating of the noise signal with the fingerprint.

20 Claims, 10 Drawing Sheets

(56) References Cited

U.S. PATENT DOCUMENTS

| | | |
|---|---|---|
| 5,392,642 A | 2/1995 | Tao |
| 5,400,648 A | 3/1995 | Mahr |
| 5,452,699 A | 9/1995 | Rossignol |
| 5,467,638 A | 11/1995 | Philipp |
| 5,594,649 A | 1/1997 | Cook et al. |
| 5,693,936 A | 12/1997 | Komachiya et al. |
| 5,763,769 A | 6/1998 | Kluzner |
| 5,837,887 A | 11/1998 | Shibata et al. |
| 5,905,193 A | 5/1999 | Hashizume et al. |
| 5,932,801 A | 8/1999 | Akishita et al. |
| 5,934,256 A | 8/1999 | Wenzlawski et al. |
| 5,996,398 A | 12/1999 | Schleupen et al. |
| 6,104,195 A | 8/2000 | Yoshinaga et al. |
| 6,273,064 B1 | 8/2001 | Scholl et al. |
| 6,276,334 B1 | 8/2001 | Flynn et al. |
| 6,330,877 B1 | 12/2001 | Nordin |
| 6,336,355 B1 | 1/2002 | Sasaki et al. |
| 6,550,311 B2 | 4/2003 | Sloboda |
| 6,598,468 B2 | 7/2003 | Zur Loye et al. |
| 6,662,781 B1 | 12/2003 | Torno et al. |
| 6,814,054 B2 | 11/2004 | Sauler et al. |
| 6,862,517 B2 | 3/2005 | Galtier |
| 6,885,932 B2 | 4/2005 | Liu et al. |
| 6,912,460 B2 | 6/2005 | Sauler et al. |
| 6,947,829 B2 | 9/2005 | Honda |
| 6,978,771 B2 | 12/2005 | Kuzuyama et al. |
| 6,990,947 B2 | 1/2006 | Kuzuyama et al. |
| 7,021,128 B2 | 4/2006 | Rauchfuss et al. |
| 7,027,909 B2 | 4/2006 | deBotton et al. |
| 7,181,338 B2 | 2/2007 | Takemura et al. |
| 7,191,658 B2 | 3/2007 | Oda et al. |
| 7,212,909 B2 | 5/2007 | Yoshino et al. |
| 7,243,529 B2 | 7/2007 | Takemura et al. |
| 7,246,600 B2 | 7/2007 | Nakashima et al. |
| 7,260,469 B2 | 8/2007 | Birk et al. |
| 7,263,872 B2 | 9/2007 | Danet et al. |
| 7,310,993 B2 | 12/2007 | Popielas et al. |
| 7,325,529 B2 | 2/2008 | Ancimer et al. |
| 7,356,404 B2 | 4/2008 | Takemura et al. |
| 7,376,506 B2 | 5/2008 | Schueler |
| 7,383,816 B2 | 6/2008 | Zurlo |
| 7,444,231 B2 | 10/2008 | Ancimer et al. |
| 7,444,236 B2 | 10/2008 | Wiles |
| 7,448,254 B2 | 11/2008 | Kurtz et al. |
| 7,546,198 B2 | 6/2009 | Remelman |
| 7,559,230 B2 | 7/2009 | Zimmer |
| 7,571,640 B2 | 8/2009 | Andrews |
| 7,628,253 B2 | 12/2009 | Jin et al. |
| 7,669,582 B2 | 3/2010 | Huang |
| 7,712,450 B2 | 5/2010 | Sato et al. |
| 7,747,380 B2 | 6/2010 | Chauvin et al. |
| 7,810,469 B2 | 10/2010 | Vigild et al. |
| 7,823,561 B2 | 11/2010 | Omuro et al. |
| 8,000,884 B2 | 8/2011 | Aso et al. |
| 8,032,293 B2 | 10/2011 | Binder et al. |
| 8,069,972 B2 | 11/2011 | Auclair et al. |
| 8,078,389 B2 | 12/2011 | Huang et al. |
| 8,079,261 B2 | 12/2011 | Crickmore et al. |
| 8,108,131 B2 | 1/2012 | Huang et al. |
| 8,155,857 B2 | 4/2012 | Loeffler et al. |
| 8,250,905 B2 | 4/2012 | Schneider et al. |
| 8,260,531 B2 | 9/2012 | Yasuda |
| 8,301,360 B2 * | 10/2012 | Masuda ............... G01L 23/225 701/111 |
| 8,316,824 B2 | 11/2012 | Hagari et al. |
| 8,342,011 B2 | 1/2013 | Galtier et al. |
| 8,359,909 B2 | 1/2013 | Duval et al. |
| 8,396,649 B2 | 3/2013 | Huang |
| 8,463,533 B2 | 6/2013 | Glugla et al. |
| 8,499,623 B2 | 8/2013 | Duval et al. |
| 8,528,521 B2 | 9/2013 | Landsmann et al. |
| 8,538,666 B2 | 9/2013 | Buslepp et al. |
| 8,606,484 B2 | 12/2013 | Ohata |
| 8,627,800 B2 | 1/2014 | Glugla et al. |
| 8,639,432 B2 | 1/2014 | Matsuo et al. |
| 8,680,707 B2 | 3/2014 | Childs et al. |
| 8,677,975 B2 | 8/2014 | Muhammad et al. |
| 8,849,471 B2 | 9/2014 | Daniel et al. |
| 2004/0267430 A1 | 12/2004 | Ancimer |
| 2008/0051975 A1 | 2/2008 | Ker et al. |

FOREIGN PATENT DOCUMENTS

| | | |
|---|---|---|
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| JP | 20110256833 A | 12/2011 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

European Search Report and Opinion issued in connection with corresponding EP Application No. 16153229.6 dated Jun. 15, 2016.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2014, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jerry Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
Reduction Piston Slap Excitation by Optimizing Piston Profiles; Takayuki Koizumi et al,; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.
Bolt loosening detection using vibration characteristics of thin plate with piezoelectric elements;Takeshi Nakahara et al; Proc.of SPIE 5391, Smart Struc. & Materials, Jul. 2004.

* cited by examiner

SYSTEM AND METHOD FOR DETECTING OPERATING EVENTS OF AN ENGINE

The subject matter disclosed herein relates to fuel combusting engines and, more specifically, to a system and method for detecting operating events and conditions of a reciprocating engine using a knock sensor.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load (e.g., a generator that produces electric power). In traditional configurations, timing of opening and closing the intake and exhaust valves during operation of the combustion engine may be monitored and estimated using traditional techniques. Traditional techniques may also be used for detecting certain other operating events and conditions (e.g., peak firing pressure) of the combustion engine. However, traditional monitoring techniques may not be accurate, and corrective measures utilizing the traditional monitoring techniques may reduce an efficiency of the internal combustion engine. Accordingly, improved monitoring of operating events and conditions, such as peak firing pressure and/or intake and exhaust valve closure (or opening) operating events, may be useful.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the present disclosure. Indeed, the present disclosure may encompass a variety of forms that may be similar to or different from the embodiments set forth below.

In a first embodiment, a method of monitoring an operating event of a combustion engine includes receiving a noise signal sensed by a knock sensor disposed in or proximate to the combustion engine, correlating the noise signal with a fingerprint having at least an ADSR envelope indicative of the operating event, and detecting if the operating event has occurred based on the correlating of the noise signal with the fingerprint.

In a second embodiment, a system includes an engine controller configured to monitor a first operating event of a combustion engine. The controller includes a processor configured receive a noise signal sensed by a knock sensor disposed in or proximate to the combustion engine, correlate the noise signal with a first fingerprint having at least a first ADSR envelope indicative of the first operating event, and detect if the operating event has occurred based on the correlating of the noise signal with the first fingerprint.

In a third embodiment, a non-transitory computer readable medium includes executable instructions that, when executed, cause a processor to receive, from a knock sensor disposed in or proximate to an internal combustion engine, noise data indicative of noise emitted by the internal combustion engine. The executable instructions, when executed, also cause the processor to receive, from a crankshaft sensor disposed in or proximate to the combustion engine, crank angle data indicative of a crank angle of a crankshaft of the internal combustion engine. Further, the executable instructions, when executed, cause the processor to plot the noise data against the crank angle data, determine a portion of the noise data that corresponds to a fingerprint having a reference ADSR envelope indicative of an operating event of the internal combustion engine, superimpose the reference ADSR envelope over the portion of the noise data, and determine a location in the noise data at which the operating event occurred.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
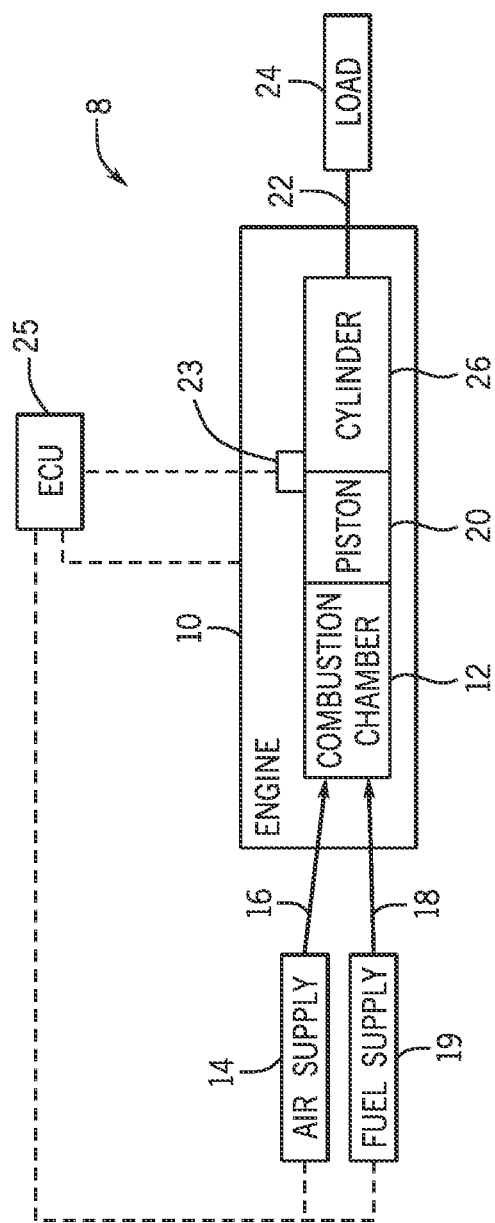
FIG. 1 is a block diagram of an embodiment of a portion of an engine driven power generation system in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments employ sensors (e.g., knock sensors, acoustic sensors, or vibration sensors) and baseline data (e.g., fingerprints of sound or vibration) to monitor, diagnose, and/or control an engine. When using a knock sensor to monitor a combustion engine, occasionally the knock sensor system records a noise, such as an abnormal or undesired noise that may not be identified at that time. Alternatively, the knock sensor may record a noise that is a normal or desired noise, where the noise has been previously identified and characterized. For example, noises emitted by the combustion engine during various actions by the combustion engine may be initially characterized during an in-factory baselining process. Noise signals for particular operating events and conditions (e.g., valve closures, valve openings, and peak firing pressure) during the baselining process may be processed and stored in a database as relating to one or more operating events. During normal operation of the combustion engine, data stored in the database relating to the operating events characterized during the baselining process may be accessed to determine if operational noise corresponds to the operating events characterized during the baselining process.

Advantageously, the techniques described herein may create a sound "fingerprint" of certain engine sounds or noise. The fingerprint (e.g., profile, comparator, and/or reference signal) may be developed during the baselining process, as described above, and the fingerprint may correspond to a particular operating event (e.g., a valve closure) tested during the baselining process. It should be noted that the baselining process may be carried out during full operation of the combustion engine or while only operating certain components (e.g., the components relating to the operating event(s) being baselined) of the combustion engine. For example, in some embodiments, various operating events of the combustion engine may be baselined in-factory during part or full operation.

During full operation of the combustion engine (e.g., after baselining), noise may be detected by the knock sensor, and the noise signal may be processed and compared to various fingerprints (e.g., profiles, signatures, comparators, reference signals, unique indicia, unique representations, etc.) relating to the combustion engine. If the fingerprint and the processed noise signal correspond or correlate (e.g., "match"), the signal may be confirmed as corresponding to the operating event relating to the fingerprint. The noise signal may also be processed to determine time-sensitive information relating to the operating event that corresponds to the matched fingerprint and noise signal. For example, if the noise signal matches a fingerprint corresponding to closure of an exhaust valve, the noise signal may be plotted with respect to time (or crank angle) to determine when the exhaust valve closed.

As described in further detail below, systems and method are provided for identifying and classifying noise via an Attack-Decay-Sustain-Release (ADSR) envelope and/or joint time-frequency techniques, where the ADSR envelope may correspond to at least a portion of the above-referenced fingerprint. The joint time-frequency techniques may include cepstrum techniques, quefrency techniques, chirplet techniques, and/or wavelet techniques to develop an acoustic model or fingerprint of the noise, as described in more detail below.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensor 23 may be any sensor configured to sense sounds or vibrations caused by the engine 10, such as sound or vibration due to detonation, pre-ignition, and or pinging. The knock sensor 23 is shown communicatively coupled to an engine control unit (ECU) 25. During operations, signals from the knock sensor 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust boost pressure to eliminate the knocking. As further described herein, the knock sensor 23 may additionally derive that certain sounds or vibrations should be further analyzed and categorized to detect, for example, undesired engine conditions.

Figure 2:
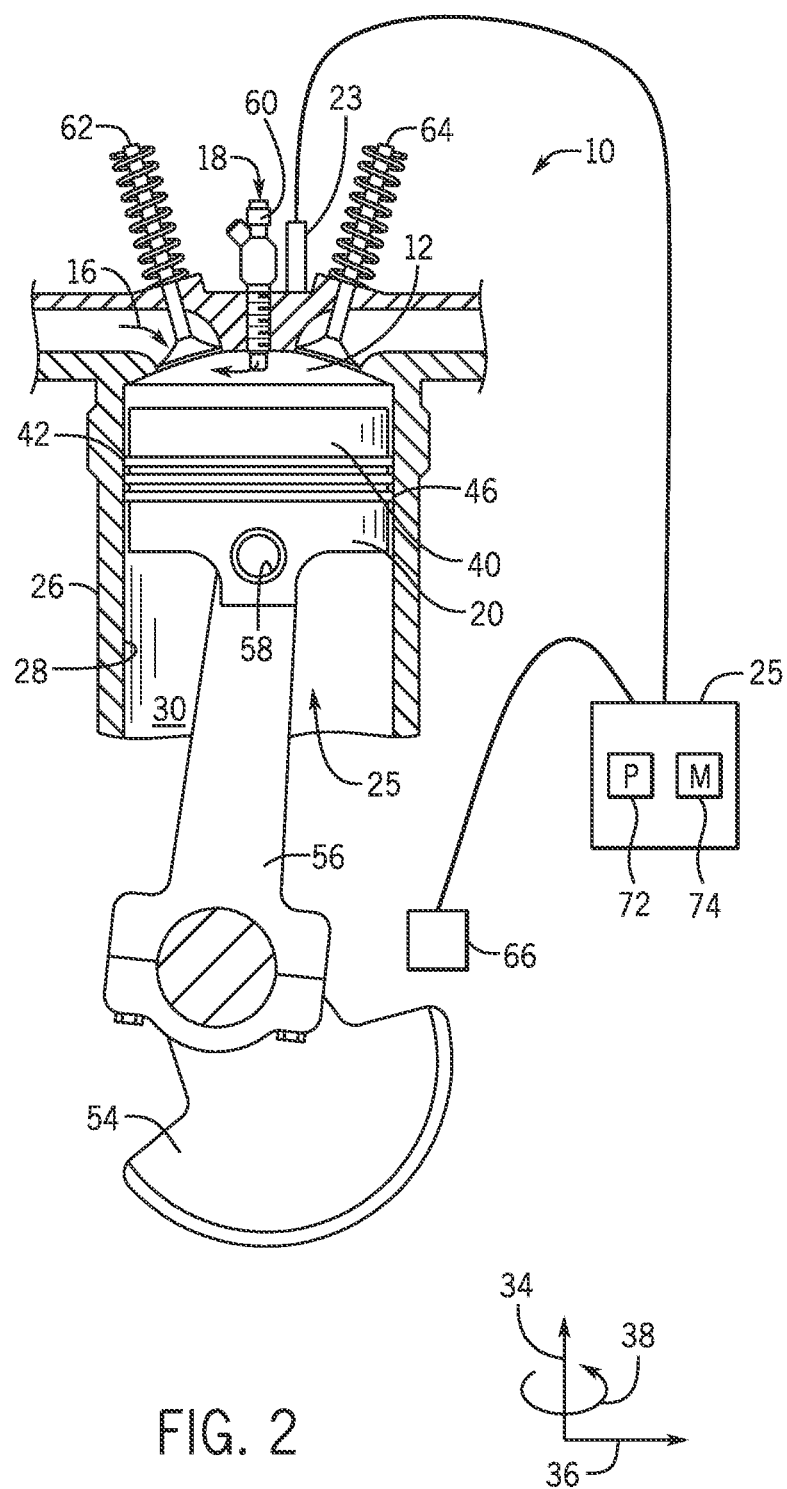
FIG. 2 is a side cross-sectional view of an embodiment of a piston assembly within a cylinder of the reciprocating engine shown in FIG. 1 in accordance with aspects of the present disclosure.

FIG. 2 is a side cross-sectional view of an embodiment of a piston assembly 25 having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC while keeping the exhaust valve 64 open. The exhaust process thus expels the spent fuel-air mixture through the exhaust valve 64. It is to be noted that more than one intake valve 62 and exhaust valve 64 may be used per cylinder 26.

The depicted engine 10 also includes a crankshaft sensor 66, the knock sensor 23, and the engine control unit (ECU) 25, which includes a processor 72 and memory 74. The crankshaft sensor 66 senses the position and/or rotational speed of the crankshaft 54. Accordingly, a crank angle or crank timing information may be derived. That is, when monitoring combustion engines, timing is frequently expressed in terms of crankshaft 54 angle. For example, a full cycle of a four stroke engine 10 may be measured as a 720° cycle. The knock sensor 23 may be a Piezo-electric accelerometer, a microelectromechanical system (MEMS) sensor, a Hall effect sensor, a magnetostrictive sensor, and/or any other sensor designed to sense vibration, acceleration, sound, and/or movement. In other embodiments, sensor 23 may not be a knock sensor in the traditional sense, but any sensor that may sense vibration, pressure, acceleration, deflection, or movement, and may not be used to detect engine "knock."

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder 26 may include one or more knock sensors 23. The crankshaft sensor 66 and the knock sensor 23 are shown in electronic communication with the engine control unit (ECU) 25. The ECU 25 includes a processor 72 and a memory 74. The memory 74 may store computer instructions that may be executed by the processor 72. The ECU 25 monitors and controls and operation of the engine 10, for example, by adjusting combustion timing, valve 62, 64, timing, adjusting the delivery of fuel and oxidant (e.g., air), and so on.

Advantageously, the techniques described herein may use the ECU 25 to receive data from the crankshaft sensor 66 and the knock sensor 23, and then to create a "noise" signature by plotting the knock sensor 23 data against the crankshaft 54 position. The ECU 25 may then go through the process of analyzing the data to derive normal (e.g., known and expected noises) and abnormal signatures (e.g., unknown or unexpected noises). The ECU 25 may then characterize the signatures, as described in more detail below. By providing for signature analysis, the techniques described herein may enable a more optimal and a more efficient operation and maintenance of the engine 10.

Figure 3:
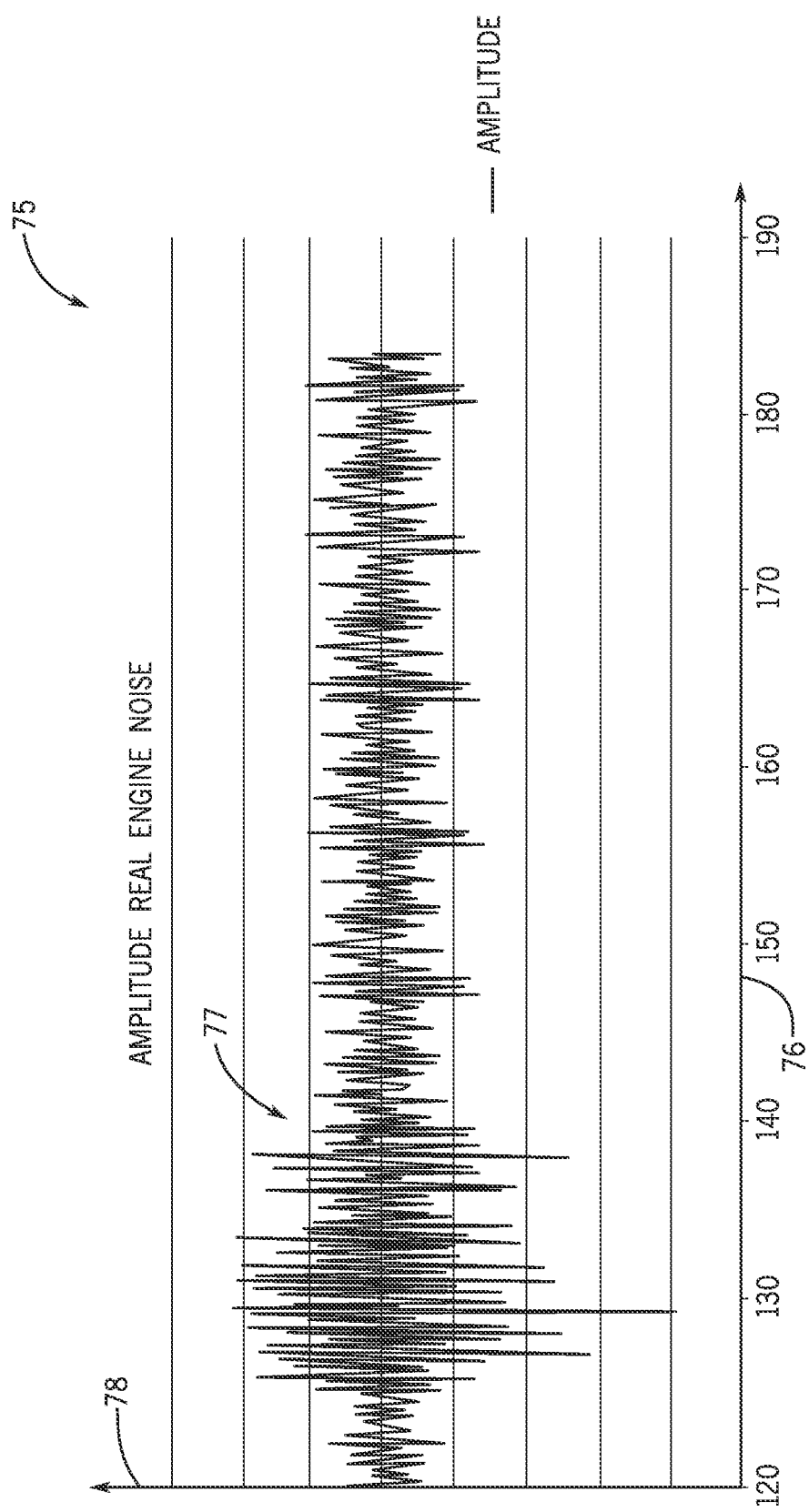
FIG. 3 is an embodiment of an engine noise plot of data measured by the knock sensor shown in FIG. 2 in accordance with aspects of the present disclosure.
Figure 5:
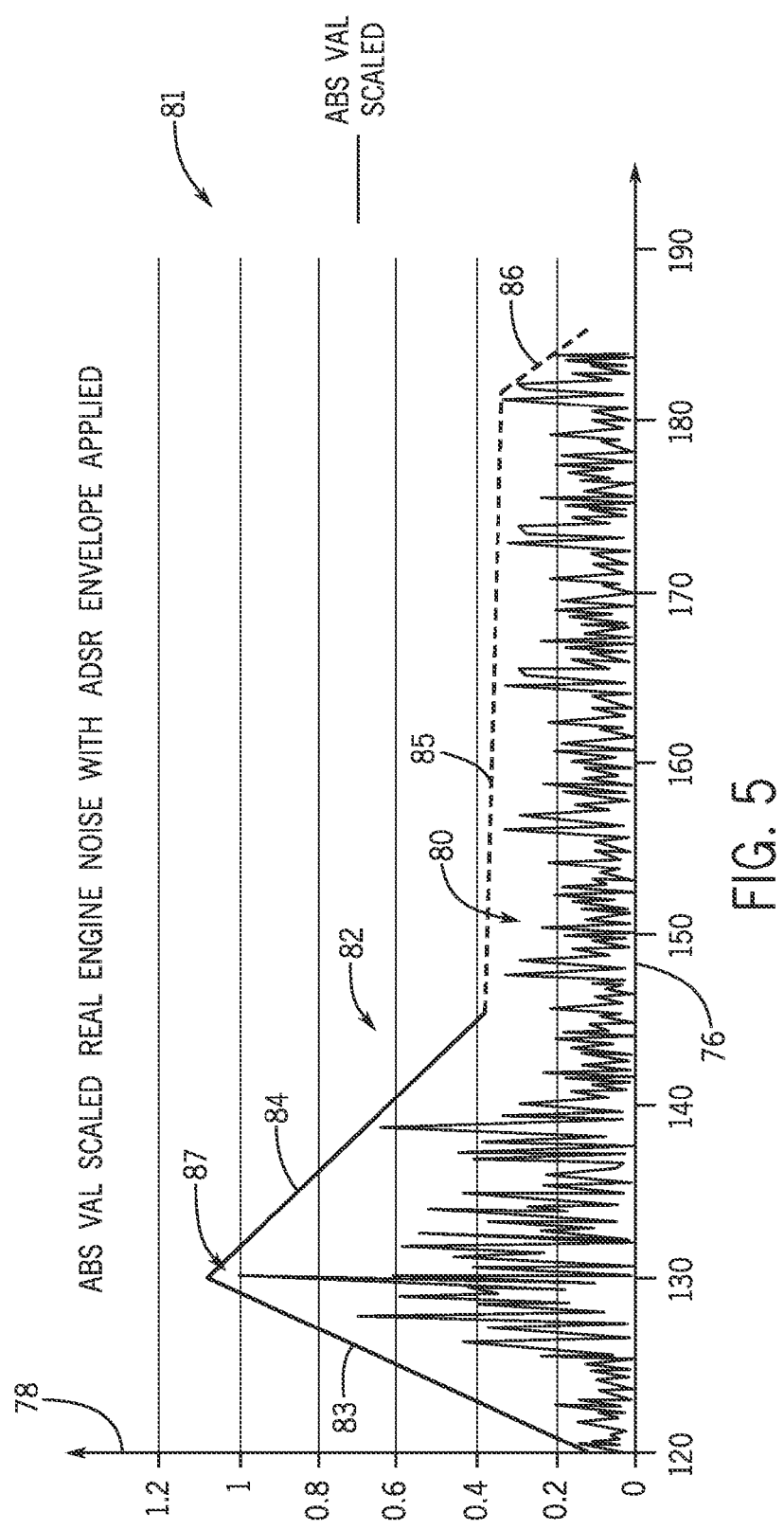
FIG. 5 is an embodiment of a sample scaled engine noise plot shown in FIG. 4 with four principle parameters of an attack, decay, sustain, release (ADSR) envelope overlaid in accordance with aspects of the present disclosure.
Figure 6:
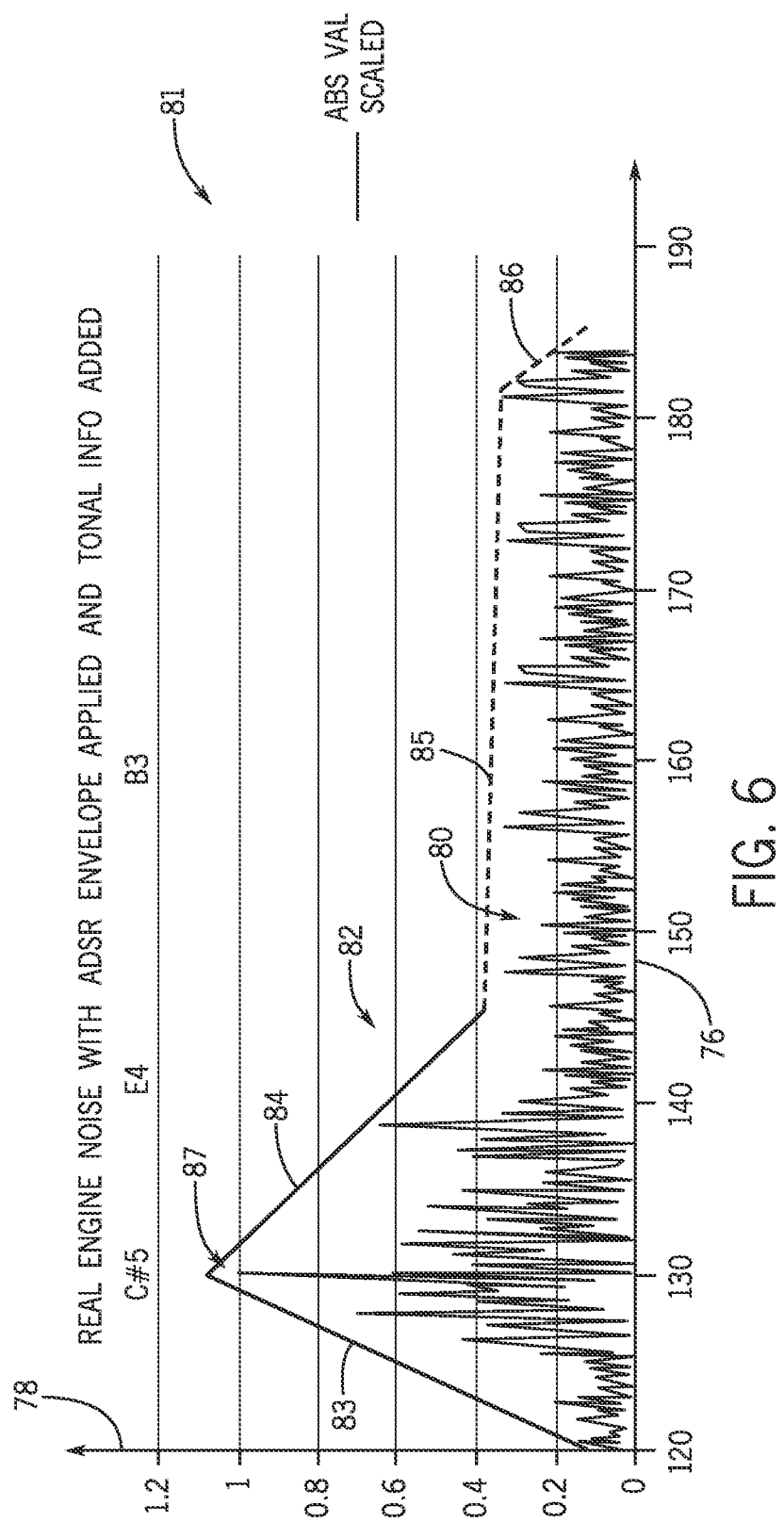
FIG. 6 is an embodiment of a scaled engine noise plot and ADSR envelope shown in FIG. 5 with the extracted tones overlaid in accordance with aspects of the present disclosure.
Figure 7:
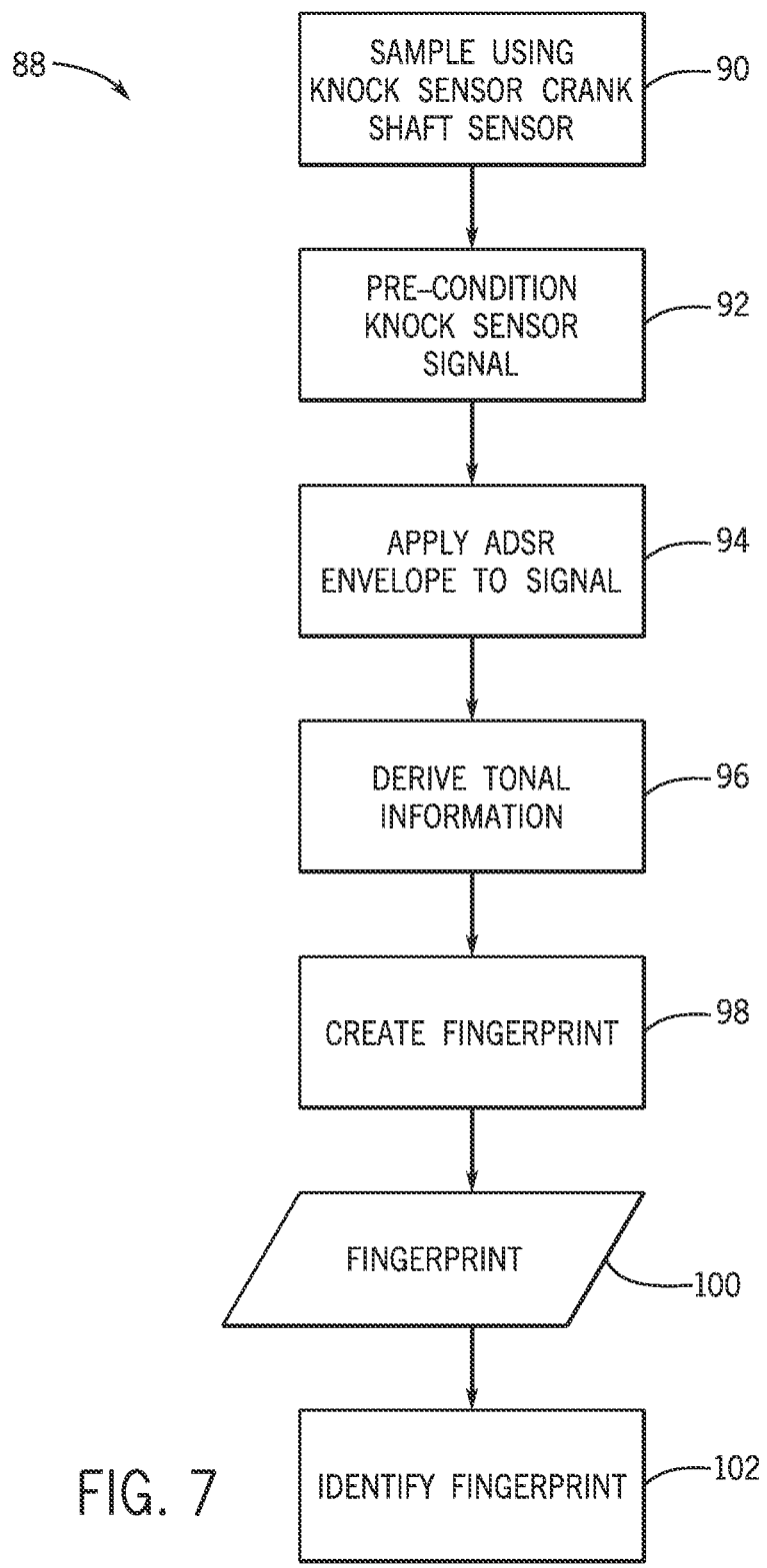
FIG. 7 is a flow chart showing an embodiment of a process for characterizing a noise in accordance with aspects of the present disclosure.
Figure 8:
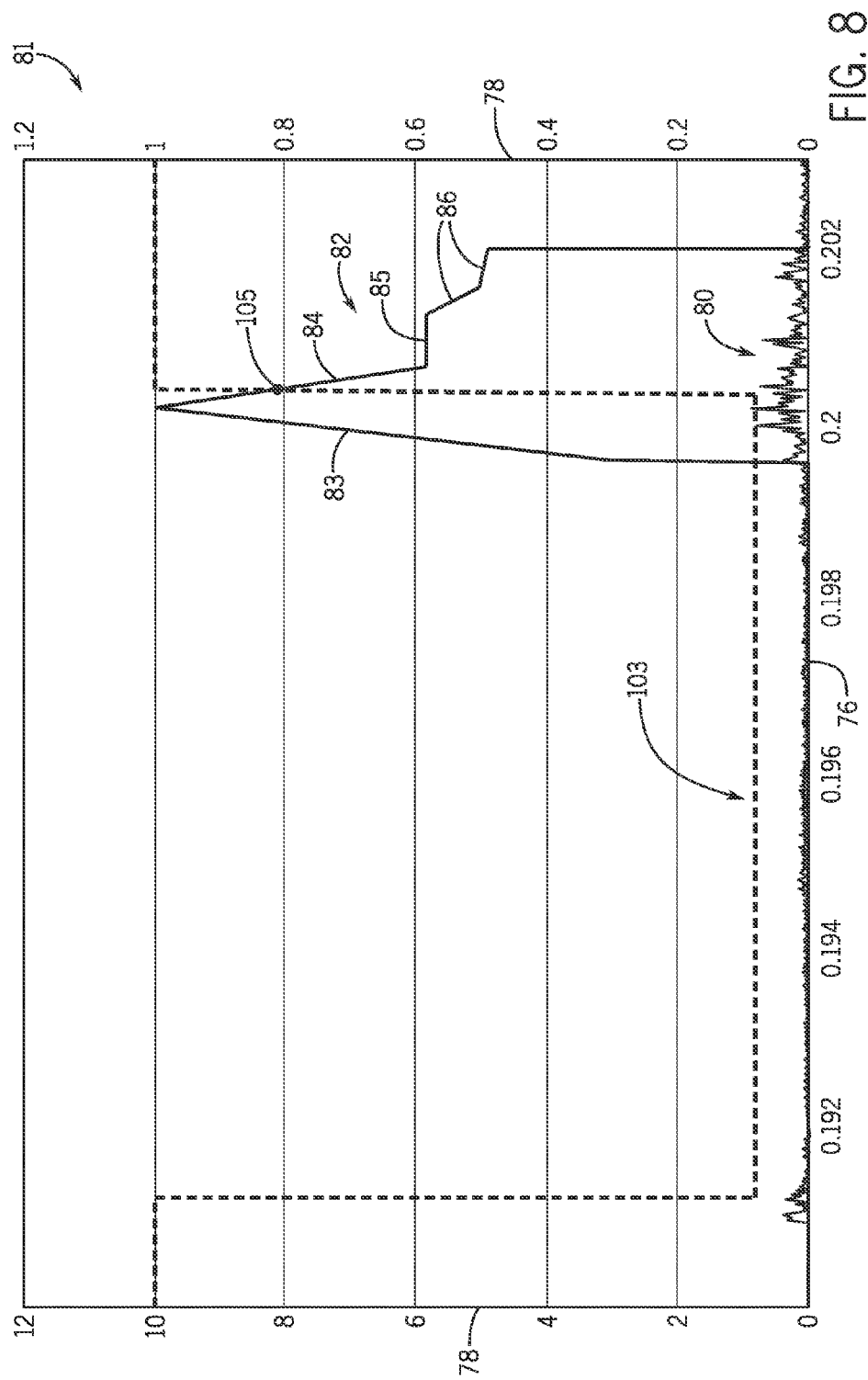
FIG. 8 is a an embodiment of a scaled engine noise plot corresponding to an engine operating event, an operating event indicator corresponding to the engine operating event, and an ADSR envelope corresponding to the engine operating event in accordance with the process of FIG. 7 and other aspects of the present disclosure.
Figure 9:
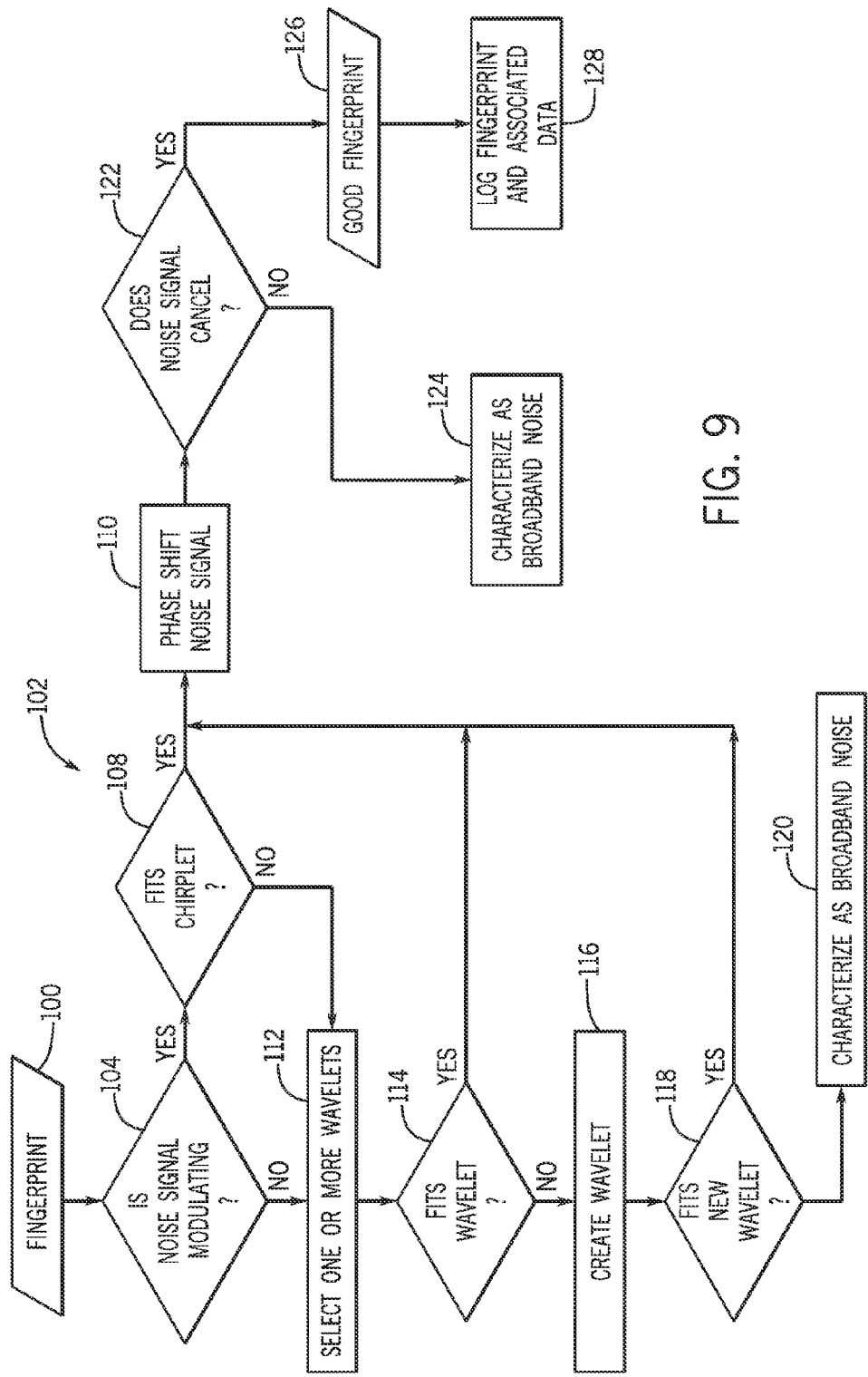
FIG. 9 is a flow chart showing an embodiment of a process for identifying a fingerprint shown in FIG. 7 in accordance with aspects of the present disclosure.

FIGS. 3-6 and 8 are illustrative of data that may be undergoing data processing, for example, via a process or processes described in more detail with respect to FIGS. 7 and 9. The data for FIGS. 3-6 and 8 may include data transmitted via the knock sensor 23 and the crankshaft sensor 66. For example, FIG. 3 is an embodiment of a raw engine noise plot 75 derived (e.g., by the ECU 25) of noise data measured by the knock sensor 23 in which x-axis 76 is crankshaft 54 position (e.g., crank angle), which is correlative of time. In accordance with present embodiments, the noise data may correspond to a particular operating event or action of the engine 10. For example, the noise data may correspond to opening or closing of a valve of the engine 10, for example, the exhaust valve 64. Alternatively, the noise data may correspond to peak firing pressure, which describes the highest pressure in the combustion chamber 12 during combustion.

The plot 75 is generated when the ECU 25 combines the data received from the knock sensor 23 and the crankshaft sensor 66 during operations of the engine 10. In the depicted embodiment, an amplitude curve 77 of the knock sensor 23 signal is shown, with an amplitude axis 78. That is, the amplitude curve 77 includes amplitude measurements of vibration data (e.g., noise, sound data) sensed via the knock sensor 23 plotted against crank angle. It should be understood that this is merely a plot of a sample data set (e.g., corresponding to closure of the exhaust valve 64), and not intended to limit plots generated by the ECU 25. The curve 77 may then be scaled for further processing, as shown in FIG. 4.

Figure 4:
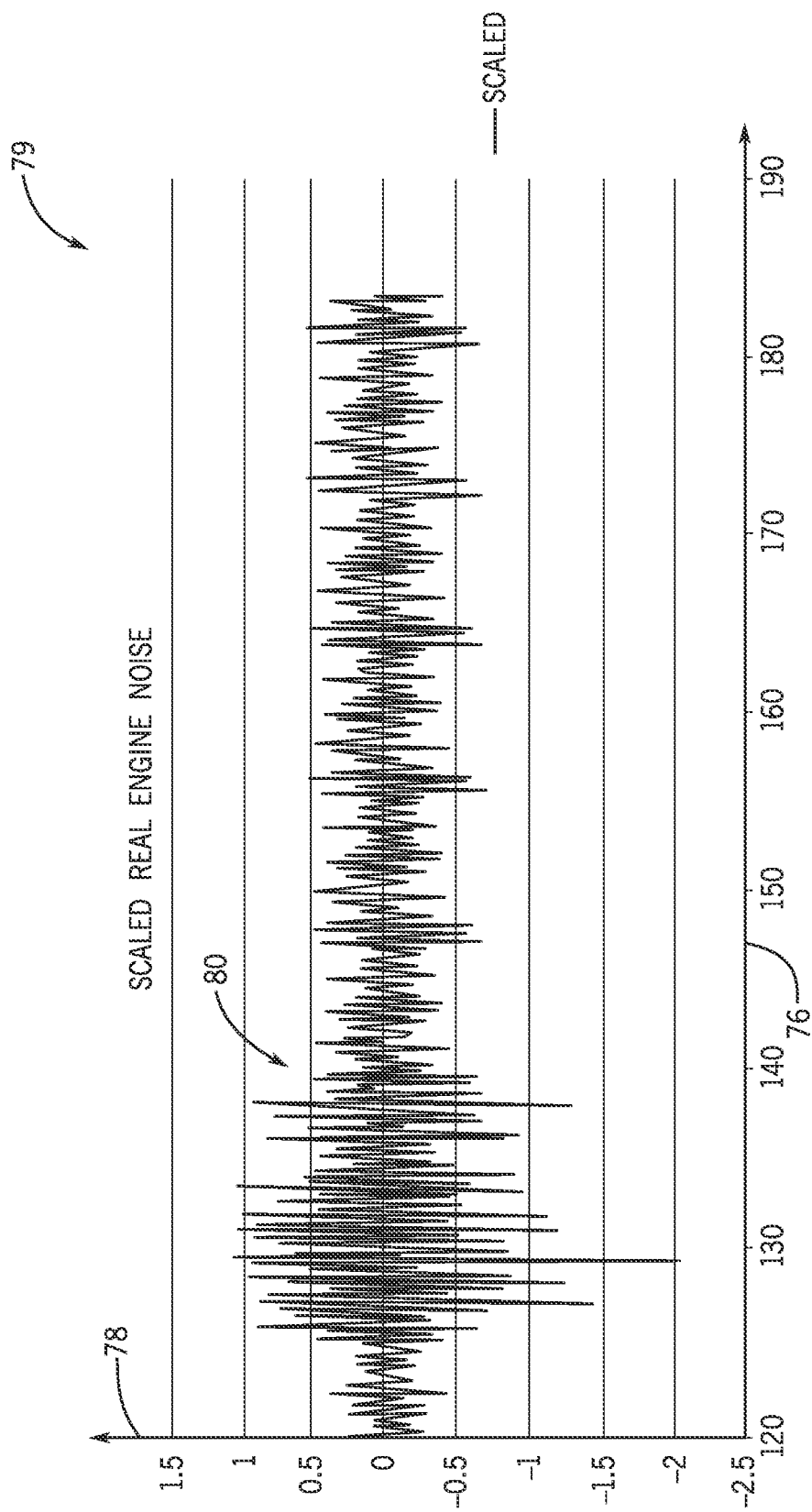
FIG. 4 is an embodiment of a scaled version of the sample engine noise plot shown in FIG. 3 in accordance with aspects of the present disclosure.

FIG. 4 is an embodiment of a scaled engine noise plot 79, which may be derived by the ECU 25. In the scaled plot 79, the raw engine noise from amplitude plot 75 shown in FIG. 3 has been scaled to derive a scaled amplitude curve 80. In this case, a single multiplier has been applied to each data point such that the maximum positive value of the scaled amplitude curve 80 is 1. Note that the multiplier applied to each point of curve 80 in order to produce a maximum positive value of 1 may result in negative values that are less than or greater than −1. That is, for example, the maximum negative value may be −0.5, or it may be −1.9, as shown in scaled engine noise plot 79 shown in FIG. 4.

FIG. 5 is an embodiment of a scaled engine noise plot 81 with four principle parameters of an attack, decay, sustain, release (ADSR) envelope 82 laid over the top of the plot. The ADSR envelope 82 is typically used in music synthesizers in order to mimic the sound of musical instruments. Advantageously, the techniques described herein apply the ADSR envelope 82 to knock sensor 23 data to more quickly and efficiently provide for certain noise analysis, as further described below. For example, the scaled curve 80 may be characteristic (or include characteristics) of a particular operating event (e.g., valve 62, 64 opening/closing or peak firing pressure in the combustion chamber 12) of the engine 10, and the ADSR envelope 82 developed for the scaled curve 80 may be utilized for future analysis of the operating event during operation of the engine 10.

The four principle parameters of the ADSR envelope are attack 83, decay 84, sustain 85, and release 86. The attack 83 occurs from the start of the noise to a peak amplitude 87 of the scaled curve 80. The decay 84 occurs in the run down from the peak amplitude to a designated sustain 85 level, which may be some specified percent of the maximum amplitude. It should be understood that the order of the four parameters does not have to be attack, decay, sustain, and release. For example, for some noises, the order may be attack, sustain, decay, and release. In such cases, an ADSR, rather than ADSR, envelope would be applied. For the sake of simplicity, this will be referred to as an "ADSR envelope," but it should be understood that the term applies to a noise regardless of the order of the parameters. The sustain 85 level is the main level during the noise's duration. In some embodiments, the sustain 85 level may occur at 55% of the maximum amplitude. In other embodiments, the sustain 85 level may be at least equal to or greater than 35%, 40%, 45%, 50%, 60%, or 65% of the maximum amplitude. A user, or the ECU 25, may check whether the sustain level is as desired by determining whether the sustain 85 level is held for at least 15% of the duration of the signature. If the sustain 85 lasts more than 15% of the duration of the signature, the sustain 85 level is set as desired. The release 86 occurs during the run down from the sustain 85 level back to zero. It should be noted that, in some embodiments, the noise signal (e.g., the scaled amplitude curve 80) may be filtered via a high-pass filter, a low-pass filter, or a band-pass filter to attenuate portions of the signal having frequencies uncharacteristic of the operating event. The particular filter applied to the noise signal may depend on the operating event being monitored. For example, when monitoring valve 62, 64 events (e.g., openings and closures), a high-pass filter (e.g., greater than 10 kilohertz (kHz)) or a band-pass filter (e.g., between 10 and 20 kilohertz (kHz)) may be applied to the noise signal. When monitoring combustion events (e.g., peak firing pressure), a low-pass filter (e.g., less than 2 kilohertz (kHz)) may be applied to the noise signal.

FIG. 6 shows the same scaled engine noise plot 79 shown in FIGS. 4 and 5 with certain tones overlaid (e.g., superimposed). After applying the ADSR envelope 82, the ECU 25 may extract three to five of the strongest frequencies in the noise and convert them into musical tones. For example, a lookup table mapping frequency ranges to musical tones may be used. Additionally or alternatively, equations may be used based on the observation that pitch is typically perceived as the logarithm of frequency for equal temperament systems of tuning, or equations for other musical temperament systems. In other embodiments, more or less frequencies may be extracted. In the plot 81 shown in FIG. 6 the three prominent (e.g., extracted) tones are C#5, E4, and B3. It should be understood, however, that these three tones are merely examples of possible tones and not intended to limit what tones may be present in a recorded noise.

FIG. 7 is a flow chart showing an embodiment of a process 88 for characterizing a noise, such as a noise sensed via the knock sensor 23. By characterizing the noise, the noise can be logged and sorted for analysis, including future analysis and/or real-time analysis. For example, in some embodiments, the process 88 may be used for characterizing a noise relating to a particular operating event or action of the engine 10, such as peak firing pressure or opening/closing of intake or exhaust valves 62, 64. Further, the noise may first be characterized during a baselining process (e.g., an in-factory baselining process) before the engine 10 is implemented for normal or full time operation, e.g., before being sold, deployed to a site, implemented at a site, etc. For example, before normal operation of the engine 10, various operating events (e.g., peak firing pressure, intake/exhaust opening/closing) may be tested by analyzing the noise emitted during the operating event(s) (and detected by the knock sensor 23), where the noise signals or ADSR envelopes 82 of the noise signals may be fingerprinted as relating to the operating events being tested, thus creating a baseline. It should be noted that the process 88 (e.g., baselining process) may be utilized when the engine 10 is not fully operating to simplify processing of the noise signal. For example, the process 88 may be utilized while only opening or closing a valve (e.g., the exhaust valve 64 or the intake valve 82) to characterize the noise corresponding to the opening or closing of the valve (e.g., the exhaust valve 64 or the intake valve 82). In other embodiments, the process 88 may be utilized during partial or during full engine 10 operations.

In the illustrated embodiment, the process 88 may be implemented as computer instructions or executable code stored in the memory 74 and executable by the processor 72 of the ECU 25. In block 90, a sample of data is taken using the knock sensor 23 and the crankshaft sensor 66. For example, the sensors 66, 23 collect data of an operating event (e.g., closure of the exhaust valve 74) during baselining and then transmit the data to the ECU 25. As previously described, the process 88 may be a baselining process and may be carried out while only particular components of the engine 10 are operating. For example, the process 88 may be carried out while opening and/or closing the exhaust valve 64 (or intake valve 62), such that the noise emitted during, for example, closing of the exhaust valve 64 may be readily processed. The ECU 25 then logs the crankshaft 54 angles at the start of data collection and at the end of data collection, as well as the time and/or crankshaft angle at the maximum (e.g., amplitude 87) and minimum amplitudes. Indeed, the crankshaft 54 angle may be logged continuously during the baselining process, enabling continuous plotting of the noise data against crankshaft 54 angle.

In block 92, the ECU 25 preconditions the knock sensor 23 data. This block 92 includes plotting the raw knock sensor 23 data against crankshaft 54 position or angle (or, in some embodiments, against time). A sample raw engine noise plot was shown in FIG. 3 as the amplitude plot 75. This block 92 also includes scaling the raw engine noise data. To scale the data, the ECU 25 determines a multiplier that would result in a maximum amplitude of positive 1. It should be noted that the maximum negative value has no effect on multiplier selection. The ECU 25 then multiplies each data point (e.g., data point in amplitude curve 77) by the multiplier, to derive the scaled amplitude curve 80, as shown in FIG. 4. It should be understood that the scaled engine noise plot 79 in FIG. 4 showing the scaled amplitude curve 80 is merely an example and not intended to limit the scope of this disclosure to plots that look the same or similar to scaled engine noise plot 79.

In block 94, the ECU 25 applies the ADSR envelope 82 to the engine noise signal. The processing in this block was discussed in describing FIG. 5. The ADSR envelope 82 is used to divide a noise data set into four different parameters or phases (attack 83, decay 84, sustain 85, release 86). As previously discussed, it should be understood that the order of the four parameters does not have to be attack, decay, sustain, and release. For example, for some noises, the order may be attack, sustain, decay, and release, or any other possible order. For the sake of simplicity, this will be referred to as an "ADSR envelope," but it should be understood that the term applies to a noise regardless of the order of the parameters. Traditionally, the ADSR envelope 82 is used in the process of reproducing a musical sound like that of a trumpet. However, in the techniques described herein, the ADSR envelope may be used to categorize and characterize noises so they can be cataloged and sorted, either for later analysis, real-time analysis, or some other purpose. The four principle parameters of the ADSR envelope 82 are attack 83, decay 84, sustain 85, and release 86. The attack 83 occurs from the start of the noise to the peak amplitude 87. The decay 84 occurs in the run down from the peak amplitude 87 to a designated sustain 85 level, which is some specified percent of the maximum amplitude. The sustain 85 level is the main level during the noise's duration. In some embodiments, the sustain 85 level may occur at 55% of the maximum amplitude. In other embodiments, the sustain 85 level may be at least equal to or greater than 35%, 40%, 45%, 50%, 60%, or 65% of the maximum amplitude. A user, or the ECU 25, may check whether the sustain level is as desired by determining whether the sustain 85 level is held for at least 15% of the duration of the signature. If the sustain 85 lasts more than 15% of the duration of the signature, the sustain 85 level is set as desired. The release 86 occurs during the run down from the sustain 85 level back to zero. In block 94 the ECU 25 measures the time from zero to maximum amplitude 87 (the maximum amplitude should have a value of 1). The ECU 25 then measures the run down time from the maximum amplitude 87 to the designated sustain level 85. The ECU 25 then measures the level and time that the noise sustains. Finally, the ECU 25 measures the time it takes for the noise to run down from the sustain level 85 to zero. The ECU 25 then logs the ADSR vectors or segments defining the ADSR envelope 82.

In block 96, the ECU 25 derives tonal information (e.g., musical tones) from the data. This block was discussed in the description of FIG. 6. During this block, the ECU 25, extracts tonal information from the data, identifying, for example, the three to five strongest tones in the data. In another embodiment, any number of tones may be identified, e.g., 1, 2, 3, 4, 5, 6, 7, 8, 9, 10, or more tones. FIG. 6 shows three tones derived from the signal, C#5, E4, and B3. The ECU 25 may derive five or more tones from the data. Though FIG. 6 shows tones C#5, E4, and B3, it should be understood that these tones are examples and the ECU 25 may derive any tones from the data. The ECU 25 then logs the derived tonal information, which may include the frequency of the fundamental derived tones (i.e., the lowest frequency tones), the order of the fundamental derived tones, the frequency of the harmonic derived tones (i.e., tones with a frequency that is an integer multiple of the fundamental frequency), the order of the harmonic derived tones, and any other relevant tonal information.

In block 98, the ECU 25 creates a fingerprint 100 based upon the ADSR envelope 82 and the tonal information derived in blocks 94 and 96. The fingerprint 100 includes a characterization of the noise, breaking the noise up into its component parts (e.g., ADSR envelope 82 components 83, 84, 85, 86, which may help identify valve opening/closing events and/or peak firing pressure) and quantifying those parts so the noise can be cataloged, categorized, and sorted. At this point in the process, the fingerprint 100 is based mostly upon the ADSR envelope in block 94 and the tonal information derived in block 96.

In block 102, the fingerprint 100 is identified and checked. Using a number of techniques, which will be described later, the fingerprint 100 may be modified or added to and then checked again. It should be noted that, as previously described, the fingerprint 100 may be logged with reference to a particular operating event or action of the engine 10. For example, the process 88 may correspond to a baselining process that characterizes noise signals relative to particular operating events that may occur during operation of the engine 10. In particular, the noise signal detected during the process 88 may relate to peak firing pressure, closure or opening of the exhaust valve 64, closure or opening of the intake valve 62, or a combination thereof. The fingerprint 100 may be stored in the memory 74 of the ECU 25 as corresponding to the particular operating event or condition being tested (e.g., baselined).

In some embodiments, the process 88 (e.g., baselining process) may include one or more additional steps that further processes the noise signal or ADSR envelope 82 to provide additional information relating to the operating event (e.g., opening or closing of the exhaust or intake valves 64, 62) or action of the engine 10. For example, for clarity, FIG. 8 is an embodiment of a scaled engine noise plot 81 with a scaled amplitude curve 80 corresponding to an engine operating event (e.g. valve opening or closing event), an operating event indicator 103 corresponding to the engine operating event, and an ADSR envelope 82 corresponding to the engine operating event in accordance with the process of FIG. 7. It should be noted, as previously described, that the engine operating event and the corresponding plot 81 in FIG. 8 may be tested (e.g., baselined via the process 88) while the engine 10 is not fully operating. Thus, the fluctuations in the illustrated amplitude curve 80 occur at predictable times corresponding to the operating event, and enable simpler processing. In other words, in some embodiments, no components or operating events of the engine 10 may emit noise other than the components or operating events being tested (e.g., baselined). Additionally or alternatively, the noise signal may be filtered via a high-pass filter, a low-pass filter, or a band-pass filter to attenuate portions of the signal having frequencies uncharacteristic of the operating event. The particular filter applied to the noise signal may depend on the operating event being monitored. For example, when monitoring valve 62, 64 events (e.g., openings and closures), a high-pass filter (e.g., greater than 10 kilohertz (kHz)) or a band-pass filter (e.g., between 10 and 20 kilohertz (kHz)) may be applied to the noise signal. When monitoring combustion events (e.g., peak firing pressure), a low-pass filter (e.g., less than 2 kilohertz (kHz)) may be applied to the noise signal.

With reference to the process 88 shown in FIG. 7, the fingerprint 100 having the ADSR envelope 82 information shown in FIG. 8 (e.g., with the attack 83, decay 84, sustain 85, and release 86) may include additional information relating to the operating event being fingerprinted or baselined. For example, during the process 88 (e.g., baselining process), an operating event indicator 103 may also be plotted over the scaled/normalized engine noise plot 81. The operating event indicator 103, for example, may be a plot provided by a switch (e.g., limit switch) that modulates between high and low to indicate the operating event during the baselining process (e.g., process 88). For example, the switch may be actuated each time the operating event occurs during the baselining process. However, in general, the switch may not be included in the engine 10 during normal operation of the engine 10, as inclusion of both the switch and the knock sensor 23 may be redundant and expensive. Thus, the switch and the corresponding operating event indicator 103 may be used during the baselining process (e.g., process 88) to more accurately determine a location in the ADSR envelope 82 at which the operating event specifically occurs (e.g., within 2-4 degrees crankshaft 54 angle, depending on the operating event), such that the ADSR envelope 82 can be stored to the ECU 25 and later utilized during normal operation of the engine 10 to determine a crankshaft 54 angle or timing at which the operating event more specifically occurs within the ADSR envelope 82.

In the illustrated embodiment, the operating event is a closure of the exhaust valve 64 shown in FIG. 2. As the exhaust valve 64 closes, the switch is actuated, thereby causing the limit switch to move from low (e.g., low voltage) to high (e.g., high voltage). The switch transmits a signal of the operating event indicator 103 to the ECU 25, which may plot the operating event indicator 103 on the scaled engine noise plot 81. An intersecting point 105 between the operating event indicator 103 and the ADSR envelope 82 may be stored along with the fingerprint 100 corresponding to the operating event (e.g., the closure of the exhaust valve 64). In the illustrated embodiment, the intersecting point 105 is located at an approximate midpoint of the decay 84 vector (e.g., within 5-10 percent of a length of the decay 84 vector from the midpoint). In general, closing of the exhaust valve 64 occurs at the midpoint or mid-region of the decay 84 vector (e.g., where the mid-region is an area defined by 5-10 percent of a length of the decay 84 vector on either side of the midpoint of the decay 84 vector), and coordinates of the midpoint of the decay 84 vector can be calculated using a geometric midpoint relationship, e.g., $P_i=[(X_1+X_2)/2, (Y_1+Y_2)/2]$, where $P_i$ is the midpoint (and, thus, the intersecting point 105), $X_1$ and $X_2$ are the X coordinates along axis 76 at either end of the decay 84 vector, and $Y_1$ and $Y_2$ are the Y coordinates along axis 78 at either end of the decay 84 vector. It should be noted that axis 78 in the illustrated embodiment includes time, but, in another embodiment, the axis 78 may include crankshaft 54 angle (e.g., crank angle) information from the crankshaft sensor 66, which is correlative of time.

After determining the intersection point 105 (which, in the illustrated embodiment relating to closure of the exhaust valve 64, is the midpoint of the decay 84 vector of the ADSR envelope 82), the fingerprint 100 (e.g., having the ADSR envelope 82 information and the intersection point 105 information) may be stored for later analysis.

In some embodiments, it may be beneficial to check the fingerprint 100 to ensure that the fingerprint 100 is accurate and can be used to identify operating events during normal operation of the combustion engine 10. For example, FIG. 9 is a flow chart showing further details of an embodiment of process 102, which identifies and checks the fingerprint 100 depicted in FIG. 7. The process 102 may be implemented as computer instructions or executable code stored in the memory 74 and executable by the processor 72 of the ECU 25. In decision 104, the ECU 25 determines whether or not the noise signal is modulating (i.e., changing from one tone to another). If the signal is not modulating (decision 104), then the ECU 25 moves on to block 112 and attempts to find a matching wavelet. A wavelet, effectively a piece or component of a wave, is a wave-like oscillation with an amplitude that begins at zero, increases, decreases, or both, and then returns to zero. Wavelets can be modified by adjusting the frequency, amplitude, and duration, which makes them very useful in signal processing. For example, in continuous wavelet transforms, a given signal may be reconstructed by integrating over the various modified frequency components. Example "mother" wavelets include Meyer, Morlet, and Mexican hat wavelets. However, new wavelets may also be created if the mother wavelets do not fit.

If the sound is modulating (decision 104), the ECU 25 moves on to decision 108 and determines whether or not the noise signal fits a chirplet. A chirp is a signal in which the frequency increases or decreases with time. Just as a wavelet is a piece of a wave, a chirplet is a piece of a chirp. Much like wavelets, the characteristics of a chirplet can be modified, and then multiple chirplets combined (i.e., a chirplet transform), in order to approximate a signal. A chirplet may modulate (i.e., change frequency) upward or downward. In decision 108, the ECU 25 may adjust the modulation of chirplets in order to fit the chirplets to the noise signal. If the ECU 25, after adjusting the modulation of chirplets, can adjust chirplets to fit the noise signal, then the ECU 25 logs whether there was a chirplet that fit the signal, and if so, the first frequency of the chirplet, the second frequency of the chirplet, and the rate of chirplet modulation in frequency/ (crank angle) or frequency per second. The ECU 25 then moves to block 110, in which the ECU 25 phase shifts the noise signal in order to check the fingerprint 100. In block 110, the ECU 25 creates a generated noise signal based upon the ASDR envelope 82 vectors or other components, extracted tonal information, and chirplet or wavelet fits. The ECU 25 then shifts (block 110) the generated signal, e.g., 180 degrees out of phase. If the characterization of the noise signal is correct, the phase-shifted generated noise signal should cancel out the noise signal.

If the noise signal does not fit a chirplet (decision 108), the ECU 25 moves on to block 112 and attempts to fit a wavelet to the noise signal. In block 112, the ECU 25 selects one or more wavelets that may fit the noise signal. The selected wavelet or wavelets may be a Meyer wavelet, a Morlet wavelet, a Mexican hat wavelet, or some other suitable wavelet. In decision 114, the ECU 25 determines whether or not the selected wavelet or wavelets fits the noise signal. If the selected wavelet fits (decision 114), the ECU 25 logs that there was a wavelet fit, the mother wavelet type, the first scale range of the wavelet, and the second scale range of the wavelet. If the wavelet fits (decision 114), the ECU 25 moves on to block 110, in which the ECU 25 phase shifts the noise signal in order to check the fingerprint 100. If one of the selected wavelets does not fit the noise signal (decision 114), the ECU 25 may move on to block 116 and create a wavelet. In decision 118, the ECU 25 determines if the newly created wavelet fits the noise signal. If the created wavelet fits (decision 118), the ECU 25 logs that there was a wavelet fit, the first scale range of the wavelet, and the second scale range of the wavelet. If the created wavelet fits the noise signal (decision 118), the ECU 25 moves on to block 110, in which the ECU phase shifts the noise signal in order to check the fingerprint 100. If the new wavelet does not fit (decision 118), the ECU 25 moves on to block 120 in which it characterizes the noise signal as broadband noise.

Returning now to block 110, if the ECU 25 finds a chirplet or wavelet that fits the noise signal, the ECU 25 may check the fit by attempting noise cancellation. Accordingly, in block 110, the ECU 25 creates a generated noise signal based upon the ASDR envelope 82 vectors or other components, extracted tonal information, and chirplet or wavelet fits. The ECU 25 then shifts (block 110) the generated signal by 180 degrees. The ECU 25 then determines (decision 122) whether the shifted signal cancels out the original noise signal within a desired residual tolerance. If the shifted signal cancels out (decision 122) the original noise signal within a desired residual tolerance, the ECU 25 determines that the fingerprint 100 is a "good" fingerprint 126 and moves on to block 128, in which the ECU 25 logs the coefficients and associated data, which may include the root mean squared (RMS) value of the signal, or the RMS error. The ECU 25 may log other data as well, including, but not limited to crankshaft angles at the beginning or end of the signal, ASDR envelope 82 vectors or other ASDR components, fundamental spectral tones, harmonic spectral tones, order of spectral tones, order of harmonic tones, whether a chirplet fit, the first chirplet frequency, the second chirplet frequency, the rate of chirplet modulation, whether a wavelet fit, the mother wavelet type, the first scale range of the wavelet, the second scale range of the wavelet, the maximum amplitude value and time, the minimum amplitude value and time, the RMS value of the signal, the RMS error of the signal against the generated signal, and whether or not the noise is classified as broadband noise. Further, as previously described, the ECU 25 may log the intersecting point 105 on the ADSR envelope 82, as shown in FIG. 8. This logged data, and other data logged by the ECU 25, allows the ECU 25 to characterize and categorize known noises (e.g., corresponding to certain operating events described in the present disclosure) so these noises can be stored on the memory component 74 of the ECU 25, perhaps transferred to some other memory device, and then logged and sorted in a database for future analysis. If, on the other hand, the ECU 25 determines (decision 122) that the shifted signal did not cancel out the original noise signal within a residual tolerance, the ECU 25 moves on to block 124 in which the noise signal is characterized as broadband noise.

Figure 10:
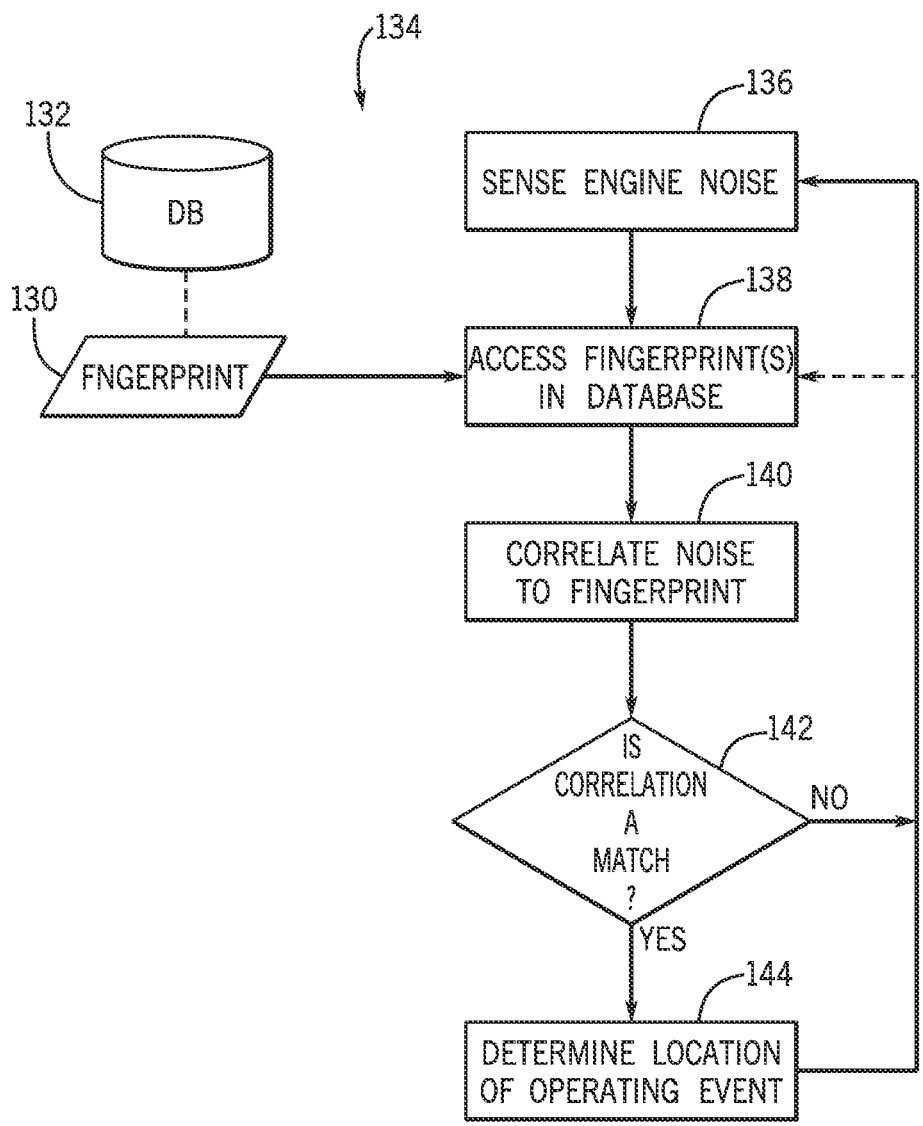
FIG. 10 is a flow chart of an embodiment of a process suitable for processing engine noise to derive certain engine operating events.

It should be noted that, depending on the embodiment, the process 102 in FIG. 9 may not be employed following the baselining method (e.g., process 88). For example, in some embodiments, it may be determined that the fingerprint 100 is a "good fingerprint 126" without employing process 102. In either case, verified fingerprints 130 (e.g., fingerprint 100 and/or good fingerprint 126) may be stored in a database 132 for later access during an engine monitoring process 134, as shown in an embodiment of the process 134 in FIG. 10. For example, during the illustrated process 134, noise from the engine 10 is sensed (e.g., detected or recorded) (block 136). As previously described, the noise may be sensed via the knock sensor 23, or some other sensor configured to detect noise or vibrations of the engine 10. The noise signal may be preconditioned (e.g., scaled, normalized, and/or filtered) for processing, in accordance with the description of FIGS. 3-5. The crankshaft sensor 66 may also sense, detect, or record a position of the crankshaft 54 (e.g., in crank angles). Accordingly, the noise signal (e.g., preconditioned noise signal) may be plotted, via the ECU 25, against the position of the crankshaft 54. As previously described, in certain embodiments, the noise signal may be plotted against time instead of position of the crankshaft 54.

The process 134 further includes accessing the fingerprints 130 in the database 132 (block 138). For example, the ECU 25 may access the fingerprint 130 that relates to a particular operating event being monitored via the process 134. Depending on the embodiment, the operating event (or condition) may be peak firing pressure, opening of the intake valve 62, closing of the intake valve 62, opening of the exhaust valve 64, closing of the exhaust valve 64, or some other operating event (or condition) of the engine 10.

After accessing the fingerprint 130 corresponding to the operating event (or condition) being monitored by the ECU 25 via process 134, the ECU 25 may correlate the fingerprint 130 and the noise signal (e.g., preconditioned noise signal) to determine if the noise signal includes a portion that matches the fingerprint 130. For example, as previously described, the fingerprint 130 may include the ADSR envelope 82 relating to the operating event being monitored and generated during the baselining process (e.g., process 88). The ADSR envelope 82 of the fingerprint 130 may be shifted or dragged along the time or crankshaft 54 position axis of the noise signal (e.g., preconditioned noise signal) to determine if the fingerprint 130 matches any portion of the noise signal. For example, the ADSR envelope 82 of the fingerprint 130 may be directly compared or matched with portions of the noise signal, or one or more operating ADSR envelopes may be generated for portions of the noise signal (e.g., in accordance with the descriptions of FIGS. 5 and 6) to compare with the ADSR envelope 82 of the fingerprint 130. Further, in general, the operating event may have occurred within a known range of time or crankshaft 54 positions (e.g., in crank angles). Thus, the portion of the noise signal processed by the ECU 25 to determine whether a portion of the noise signal matches the fingerprint 130 may be reduced to the known range of time or crankshaft 54 positions. It should be noted that the match between the fingerprint 130 and the noise signal may not be an exact match between the fingerprint 130 and the noise signal. For example, the fingerprint 130 may substantially match a portion of the noise signal and may be rated by a percentage of accuracy of the match. A threshold (e.g., stored in the memory 74 of the ECU 25) may enable the ECU 25 to determine if the percentage of accuracy of the match between the fingerprint 130 and the noise signal is substantial enough to consider the fingerprint 130 and the noise signal a match. The threshold may be at least equal to or greater than a 75% match, an 80% match, an 85% match, a 90% match, a 95% match, a 97% match, a 98% match, a 99% match, or a 100% match.

In decision 142, the ECU 25 determines if the fingerprint 130 matches any portion of the noise signal (e.g., preconditioned noise signal) from block 136. If the correlation in block 140 is a match in decision 142, the operating event being monitored is verified. Further, as shown in block 144, the particular location of the operating event (e.g., in time or in crank angles of the crankshaft 54) may be determined. For example, as previously described, the operating event may occur at the intersection point 105 (e.g., between the ADSR envelope 82 and the operating event indicator 103) in FIG. 8, which, in some embodiments, corresponds to the midpoint on the decay 84 vector of the ADSR envelope 82. Accordingly, the ECU 25 may overlay the ADSR envelope 82 of the fingerprint 130 on the noise signal plotted against crankshaft 54 position, and determine that the operating event occurred at the x-coordinate (e.g., time or crankshaft 54 position coordinate) of the intersection point 105 on the ADSR envelope 82.

If the fingerprint 130 is not matched with any portion of the noise signal at decision 142, the process 134 may either return to block 136 (e.g., sense engine noise) or return to block 138 (access fingerprint(s) in database). For example, in some embodiments, the process 134 may be utilized to monitor multiple operating events. Accordingly, the process 134 may include accessing multiple fingerprints 130 for correlation with the noise signal. The multiple fingerprints 130 may be accessed all in one step, or each fingerprint 130 may be accessed and then correlated to the noise signal independently to determine and verify operating events.

In accordance with the present disclosure, it should be noted that operating event(s) and conditions may be any operating event or condition of the engine 10. For example, the operating event may be an opening of the exhaust valve 64, a closing of the exhaust valve 64, an opening of the intake valve 62, a closing of the intake valve 62, peak firing pressure, or any other operating event of the engine 10. Further, it should be noted that the crank angle at which the operating event occurs may be determined by the same or similar process steps described above. For example, in some embodiments, the operating event may occur at a different point along the decay 84 vector, or along one of the other vectors of the ADSR envelope 82. The operating event indicator 103 shown in FIG. 8 may be provided to the ECU 25 by a limit switch, or by some other mechanism configured to detect the operating event during the baselining process (e.g., process 88) that may not be included in the engine 10 during normal operation. Further, it should be noted that the fingerprints 100, 126, 130 associated with each operating event may vary for each operating event, and may vary for each model, make, or series of engines 10. Thus, the baselining process (e.g., process 88) to determine fingerprints 100, 126, 130 for various operating events may be carried out for each particular engine 10, and each engine 10 may include different fingerprints 100, 126, 130 for the same operating event.

Technical effects of the invention include characterizing a noise signal and deriving a signature or fingerprint from the noise signal, which may additionally include preconditioning the noise signal, applying an ADSR envelope to the noise signal, extracting tonal information (e.g., musical tones) from the noise signal and fitting the noise signal to a chirplet and/or a wavelet. Further, technical effects of the invention may include determining a timing of particular operating events with respect to crank angle based on the characterization of the noise signal and derivation of the signature(s) and/or fingerprints from the noise signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
  an engine controller configured to monitor a first operating event of a combustion engine, wherein the engine controller comprises a processor configured to:
    receive a noise signal sensed by a knock sensor disposed in or about a cylinder of the combustion engine;
    correlate the noise signal with a first fingerprint having at least a first Attack-Decay-Sustain-Release ("ADSR") envelope indicative of the first operating event; and
    detect if the first operating event has occurred based on the correlating of the noise signal with the first fingerprint.

2. The system of claim 1, wherein the controller comprises a memory configured to store one or more fingerprints, each fingerprint having a respective ADSR envelope indicative of a corresponding operating event, and wherein the processor is configured to access the memory to correlate the noise signal with the first fingerprint having at least the first ADSR envelope indicative of the first operating event.

3. The system of claim 1, comprising the knock sensor configured to sense the noise signal and a crankshaft sensor configured to sense a crank angle of a crankshaft of the combustion engine.

4. The system of claim 3, wherein the processor is configured to plot the noise signal, or a preconditioned version of the noise signal, against the crank angle, and superimpose the first ADSR envelope over the noise signal or preconditioned noise version of the noise signal.

5. The system of claim 4, wherein the processor is configured to derive a location on the superimposed first ADSR envelope at which the operating event occurs.

6. The system of claim 5, wherein the processor is configured to determine a midpoint of a decay vector of the superimposed first ADSR envelope, wherein the location on the superimposed first ADSR envelope at which the operating event occurs is the midpoint.

7. The system of claim 1, wherein the operating event comprises an opening of an intake valve of the combustion engine, a closing of the intake valve, an opening of an exhaust valve of the combustion engine, a closing of the exhaust valve, or a peak firing pressure.

8. A non-transitory computer readable medium comprising executable instructions that, when executed, cause a processor to:
- receive, from a knock sensor disposed in or about a cylinder of a combustion engine, noise data indicative of noise emitted by the combustion engine;
- receive, from a crankshaft sensor disposed in or about the cylinder of the combustion engine, crank angle data indicative of a crank angle of a crankshaft of the combustion engine;
- plot the noise data against the crank angle data;
- determine a portion of the noise data that corresponds to a fingerprint having a reference Attack-Decay-Sustain-Release ("ADSR") envelope indicative of an operating event of the combustion engine;
- superimpose or plot the reference ADSR envelope over the noise data; and
- determine a location in the noise data at which the operating event occurred.

9. The non-transitory computer readable medium comprising executable instructions of claim 8 that, when executed, further cause the processor to:
- determine a midpoint on a decay vector of the reference ADSR envelope, wherein the midpoint on the decay vector of the reference ADSR envelope corresponds to the location at which the operating event occurs.

10. The non-transitory computer readable medium comprising executable instructions of claim 8 that, when executed, further cause the processor to precondition the noise data before plotting the noise data.

11. A method of monitoring an operating event of a combustion engine, comprising:
- receiving a noise signal sensed by a knock sensor disposed in or about a cylinder of the combustion engine;
- correlating the noise signal with a fingerprint having at least an Attack-Decay-Sustain-Release ("ADSR") envelope indicative of the operating event of the combustion engine; and
- detecting if the operating event has occurred based on the correlating of the noise signal with the fingerprint.

12. The method of claim 11, wherein the operating event comprises an opening of an intake valve of the internal combustion engine, a closing of the intake valve, an opening of an exhaust valve of the internal combustion engine, a closing of the exhaust valve, or a peak firing pressure.

13. The method of claim 11, comprising baselining the combustion engine to derive the fingerprint having at least the ADSR envelope indicative of the operating event.

14. The method of claim 13, wherein baselining the combustion engine to derive the fingerprint having at least the ADSR envelope comprises:
- deriving the ADSR envelope from a baseline noise signal indicative of the operating event and plotting the ADSR envelope and operating event indicator data against time to derive a location of the ADSR envelope at which the operating event occurs.

15. The method of claim 14, comprising deriving the location of the ADSR envelope at which the operating event occurs by determining an intersecting point between the ADSR envelope and the operating event indicator data.

16. The method of claim 14, comprising receiving the operating event indicator data via a signal from a switch that monitors the operating event during the baselining of the combustion engine.

17. The method of claim 14, wherein the location of the ADSR envelope at which the operating event occurs is approximately a midpoint of a decay vector of the ADSR envelope.

18. The method of claim 14, wherein the location of the ADSR envelope at which the operating event occurs is within a mid-region of a decay vector of the ADSR envelope.

19. The method of claim 11, wherein correlating the noise signal with the fingerprint having at least the ADSR envelope indicative of the operating event comprises preconditioning the noise signal and superimposing the ADSR envelope onto at least a portion of a plot of the preconditioned noise signal.

20. The method of claim 11, wherein correlating the noise signal with the fingerprint having at least the ADSR envelope indicative of the operating event comprises plotting the noise signal, or a preconditioned version of the noise signal, against a crank angle signal of a crankshaft of the combustion engine received from a crankshaft sensor and superimposing the ADSR envelope of the fingerprint onto at least a portion of the plot.

\* \* \* \* \*